United States Patent Office 2,844,561
Patented July 22, 1958

2,844,561

DISPERSION POLYMERIZATION OF FORMALDEHYDE IN THE PRESENCE OF AN ORGANIC SYNTHETIC POLYMER

Max Fredrick Bechtold, Kennett Square, Pa., and Robert Neal MacDonald, Wilmington, Del., assignors to E. I. du Pont de Nemours and Company, Wilmington, Del., a corporation of Delaware No Drawing. Application June 30, 1953
Serial No. 365,278

7 Claims. (Cl. 260—45.5)

This invention relates to the production of formaldehyde polymers, and especially to an improved method of obtaining such polymers by a dispersion technique.

This is a continuation-in-part of copending application Serial No. 307,365 filed by M. F. Bechtold and R. N. MacDonald on August 30, 1952, and now abandoned.

It has been known in the past that formaldehyde could be polymerized to various qualities of product. Such methods and products are described in H. Staudinger, "Die Hochmolekularen Organischen Verbindungen," Julius Springer, Berlin, 1932 and in Walker, "Formaldehyde," Reinhold Publishing Corp., New York, 1944. The polymers made according to these publications are produced in a solid block form, the process being known as "bulk polymerization," or the polymerization takes place in an unagitated liquid medium which is a solvent for the monomeric formaldehyde, the process being known as "solution polymerization." In contrast with these known processes, the present invention polymerizes formaldehyde to produce a dispersed product.

In copending applications, Serial No. 365,235, filed by R. N. MacDonald on June 30, 1953, Serial No. 365,234 filed by R. N. MacDonald on June 30, 1953, and in U. S. Patent 2,768,994 issued to R. N. MacDonald on October 30, 1956, there are described methods for obtaining high molecular weight formaldehyde polymers which have excellent molding characteristics and yield films having a high degree of toughness. The present invention provides still another route for obtaining such superior high molecular weight formaldehyde polymers.

It is an object of this invention to produce superior high molecular weight polymers of formaldehyde by a novel process. It is another object of this invention to produce superior high molecular weight formaldehyde polymers in a dispersed form. Still another object of this invention is to produce high polymers of formaldehyde which contain nitrogen derived from tertiary-aminonitrogen-containing copolymers, and which are superior in their ability to remain tough after long periods of aging. Other objects will become apparent in the more detailed description of the invention given hereinafter.

The advantages of the present invention lie in the fact that, although polymers of formaldehyde have been made before by such methods as "bulk polymerization" or "solution polymerization," the prior art could not produce high polymers of formaldehyde which were sufficiently stable to retain their excellent qualities. Since formaldehyde is a plentiful and relatively inexpensive commodity, it is highly desirable that a high quality polymeric formaldehyde be produced, as well as an economical method for preparing such a product. It will be seen that fibers, filaments, films, moldable compositions and other synthetic plastic materials can be prepared from this new and useful polymer.

A distinctive feature of the present invention is that the formaldehyde polymers produced thereby contain a small amount of nitrogen derived from a polymeric substance, which serves as a dispersing agent and a polymerization initiator, and which contains tertiary aminonitrogen. The combined nitrogen apparently imparts a certain amount of stability to the formaldehyde polymer in such a way that articles produced from the polymer are flexible and tough even after being subjected to a period of heating sufficient to embrittle ordinary formaldehyde polymers.

Polymers are produced according to this invention by polymerizing anhydrous monomeric formaldehyde in a medium which is a non-solvent for the polymer, in the presence of a polymer containing tertiary amino-nitrogen. In addition to the nitrogen polymer, other polymerization initiators may be employed in certain embodiments of this invention.

The role which the tertiary amino-nitrogen-containing polymers play in producing the products of this invention is not known. It appears, however, that the amine polymer functions as a dispersing agent, polymerization initiator, and high temperature polymer stabilizer. Some of the amine polymer appears to be combined in the resultant formaldehyde polymer, since extraction of the formaldehyde polymer with a solvent for the amine polymer does not remove the latter.

To obtain the desired effect, the tertiary amino-nitrogen-containing polymer should contain at least 0.1% by weight of tertiary amino nitrogen, and have an inherent viscosity of at least 0.1, as determined at 0.1% weight-volume concentration in benzene at 25° C.

In practice, anhydrous monomeric formaldehyde, which is conveniently obtained by the pyrolysis of alpha-polyoxy-methylene, is passed into a medium which is a non-solvent for polymeric formaldehyde, containing up to 20% by weight of the reaction medium of a tertiary amino-nitrogen-containing polymer. The formaldehyde polymer which forms is separated, conveniently by filtration, and dried at room temperature under vacuum.

Toughness is determined by subjecting an aged film, 3 to 7 mils thick, to a series of creasing actions. The film is aged by maintaining it at a temperature of 105° C. for 7 days under otherwise ordinary atmospheric conditions. The film is then subjected to a series of creasing cycles which consists of folding the film through 180° and creasing, and then folding in the reverse direction through 360° and creasing to complete one cycle. The number of creasing cycles which the film withstands before breaking at the crease line is referred to herein as the "degree of toughness." Thus, if a film cannot be creased without breaking, it has a "degree of toughness" of zero, and if the film breaks on the second cycle, its "degree of toughness" is one, and so forth.

The examples which follow are submitted to illustrate and not to limit this invention. Unless otherwise stated, parts are by weight and inherent viscosities refer to the values calculated from viscosity measurements on 0.5% solutions of the formaldehyde polymer at 60° C. in p-chlorophenol containing 2% alpha-pinene.

*Example I.*—One hundred parts of alpha-polyoxymethylene (i. e., low molecular weight formaldehyde polymer) was pyrolyzed over a period of three hours and the monomeric formaldehyde which formed was swept at atmospheric pressure through two traps held at −15° C. The monomeric formaldehyde thus produced was passed into a reaction chamber cooled to −30° C. and containing a rapidly agitated mixture of 501 parts of n-pentane and 3 parts of a 50% kerosene solution of an 80:20 lauryl methacrylate/beta-diethylaminoethyl methacrylate copolymer. The formaldehyde polymer which formed was a white, granular solid having an inherent viscosity of 2.0. Kjeldahl analysis showed the polymer to contain 0.02% nitrogen, which corresponds to about 1% lauryl methacrylate/beta-diethylaminoethyl methacrylate copolymer in the final product. Before analysis, the formaldehyde polymer had been extracted with ether, an active solvent for the lauryl methacrylate/beta-diethylaminoethyl methacrylate copolymer. The resulting formaldehyde polymer was very stable as evidenced by the fact that it was successfully injection-molded at 200° C. to give tough, uniform bars in a recovery of 96%. A 5-mil pressed film of this polymer had a degree of toughness greater than 100.

*Example II.*—The process of Example I was repeated using the same hydrocarbon medium, the same temperature conditions for the polymerization, and the same lauryl methacrylate/beta-diethylaminoethyl methacrylate copolymer solution. Formaldehyde polymer formed rapidly with the production of a thick slurry. The slurry was discharged onto a suction filter, the polymer washed with ether, and then air- and vacuum-dried. There was obtained 42 parts of snow-white, granular, nitrogen-containing formaldehyde polymer with inherent viscosity 2.3. This polymer could be compression-molded into tough, translucent films at 190° to 225° C. A compression-molded film of this polymer had a degree of toughness of more than 100 and had a smooth, homogeneous appearance after 7 days at 105° C.

A similar experiment using the same ingredients and proportions gave 66 parts of nitrogen-containing formaldehyde polymer having an inherent viscosity of 2.9 with comparably good thermal stability and a degree of toughness greater than 100.

A high viscosity polyoxymethylene (having an inherent viscosity of 10.7) made by the low temperature (−80° C.) "bulk polymerization" of formaldehyde had a degree of toughness of zero.

*Example III.*—One hundred parts of alpha-polyoxymethylene was pyrolyzed in the manner of Example I and the formaldehyde vapors, after passing through two traps held at −15° C., were contacted with 626 parts of n-pentane, maintained at 25° C. and containing three parts of the kerosene solution of the lauryl methacrylate/beta-diethylaminoethyl methacrylate copolymer of Example I. Over a period of three hours there were obtained 31 parts of a snow-white, nitrogen-containing granular solid having an inherent viscosity of 2.5. Pressed films of this material were tough and translucent and had a degree of toughness in excess of 100.

Experiments similarly were carried out using either an 85/10/5 lauryl methacrylate/methacrylanilide/4-dimethylaminocyclohexyl methacrylate copolymer, a 57/22/21 2-ethylhexyl acrylate/beta-diethylaminoethyl methacrylate/propylene copolymer, or a 94/6 lauryl methacrylate/bis(dimethylaminomethyl)methyl methacrylate copolymer. Lauryl methacrylate/beta-diethylaminoethyl methacrylate copolymers having ratios other than the 80/20 (e. g., 95/5; 90/10; 60/40; 25/75) were used as the disperant initiator in experiments similar to Examples I and II and gave formaldehyde polymers of similarly good properties with respect to thermal stability and retention of toughness at elevated temperatures. In fact, in each case the degree of toughness was greater than 100.

*Example IV.*—In the manner described in the preceding examples, anhydrous, monomeric formaldehyde from the pyrolysis of 100 parts of alpha-polyoxymethylene was passed into 880 parts of decahydronaphthalene containing three parts of the kerosene solution of the lauryl methacrylate/beta-diethylaminoethyl methacrylate copolymer of Example I held at 43° to 54° C. There were obtained 22 parts of granular, snow-white nitrogen-containing formaldehyde polymer of the same high thermal stability. Films made from this polymer each had a degree of toughness greater than 100.

*Example V.*—Substantially anhydrous monomeric formaldehyde was prepared by pyrolyzing 100 parts of alpha-polyoxymethylene and conducting the pyrolysis vapors through two empty U-tube traps maintained at −15° C. The formaldehyde vapors were then introduced into a reactor containing 599 parts of pentane, 44 parts of benzene, and 1.5 parts of an 80:20 copolymer of lauryl methacrylate/beta-diethylaminoethyl methacrylate dissolved in 1.5 parts of kerosene. The formaldehyde monomer was introduced into the reaction medium, maintained at 25° C., over a period of 4.2 hours and snow-white, dispersed particles of a high molecular weight polymer of formaldehyde formed continuously during this elapsed time. After filtration and washing there was recovered 30 parts of this polymer having an inherent viscosity of 2.0. Tough, translucent films, 3–7 mils in thickness, were pressed at 190° to 220° C. under 1500 pounds ram pressure for 1 minute. These films exhibited a degree of toughness greater than 1.

*Example VI.*—Substantially anhydrous monomeric formaldehyde was prepared by pyrolyzing 100 parts of alpha-polyoxymethylene and passing the pyrolysis vapors through two empty U-tube traps maintained at −15° C. The monomer was then passed into a reaction medium maintained at 25° C. and containing 880 parts of benzene, 0.1 part of diphenylamine, and 1 part of an 80:20 copolymer of lauryl methacrylate/beta-diethylaminoethyl methacrylate dissolved in 1 part of kerosene. The formaldehyde monomer was introduced into the reaction medium over a period of 4 hours and snow-white particles of a high molecular weight polymer of formaldehyde formed continuously during that time. The polymer which was recovered amounted to 49.4 parts and had an inherent viscosity of 3.2. Tough, translucent films, 3–7 mils in thickness, were pressed at 190°–200° C. under 1500 pounds ram pressure for 1 minute. These films exhibited a degree of toughness greater than 1.

*Example VII.*—Substantially anhydrous formaldehyde was prepared by pyrolyzing 100 parts of alpha-polyoxymethylene and passing the pyrolysis vapors through a series of 6 U-tubes maintained at −15° C., 4 of which U-tubes were filled with inert packing material and 2 of which were empty. The formaldehyde vapors were introduced into a reactor charged with 780 parts of cyclohexane and 15 parts of an 80:20 copolymer of lauryl methacrylate/beta-diethylaminoethyl methacrylate dissolved in 15 parts of kerosene. The formaldehyde was introduced over a period of 3.7 hours into the reaction medium which was agitated and maintained at a temperature of 25° C. Snow-white dispersed particles of high molecular weight polymeric formaldehyde formed continuously during this period. The total amount of polymer recovered was 53.5 parts. The polymer had an inherent viscosity of 3.5 measured at 60° C. as a 0.1% solution in p-chlorophenol containing 2% by weight of alpha-pinene. Tough, translucent films were molded at 190° C. and 1500 pounds ram pressure for 0.5 minute.

*Example VIII.*—Substantially anhydrous monomeric formaldehyde was fed into a 5 liter, stirred reactor containing 2200 grams of anhydrous benzene, and .0035 gram of an 80:20 copolymer of lauryl methacrylate/beta-diethylaminoethyl methacrylate. The monomer was fed continuously into the reactor at a rate of about 2 grams per minute, the monomer bubbling through the benzene and out of the reactor through an exit line. The temperature of the benzene was maintained at 30° C. and the reaction time was 163 minutes. Snow-white, dispersed particles formed during the reaction in the amount of 10.3 grams. The product was washed with cyclohexane and then with methanol and finally dried. The product was a high molecular weight polymer of formaldehyde having an inherent viscosity of 1.6 measured at 60° C. as a 0.5% solution in p-chlorophenol containing 2% by weight of alpha pinene.

The concentration of the 80:20 copolymeric catalyst, based on the total monomer passing through the reactor (326 grams) was about 0.001% by weight of the monomer. Based on the amount of polymer formed plus the amount of monomer dissolved in the benzene (3.17% by weight at 30° C.), the concentration of the 80:20 copolymer was 0.004% by weight of the formaldehyde.

*Example IX.*—One hundred parts of alpha-polyoxymethylene was pyrolyzed over 3.9 hour period to generate monomeric formaldehyde which was passed through two traps held at −15° C., and then into a reactor in which a solution of 780 parts of cyclohexane, 0.2 part of diphenylamine, 1 part of an 80/20 lauryl methacrylate/beta-diethylaminoethyl methacrylate copolymer, in 1 part of kerosene was rapidly agitated at 25° C. Snow-white particles of high molecular weight formaldehyde polymer formed continuously during this time. The polymer recovered amounted to 50.7 parts and had an inherent viscosity of 6.5 measured at 60° C. as a 0.1% solution in p-chlorophenol containing 2% by weight of alpha-pinene. Tough, translucent films of 3–7 mils in thickness were pressed at 190° to 200° C. under 1500 lbs. ram pressure for one minute. The degree of toughness of these films was greater than 1.

A portion of the above polymer was placed in a melt extruder at 200° C. for 42 minutes to test melt stability. Thereafter, smooth, bubble-free filaments were melt spun, which on being drawn 10 times at 160° C., followed by relaxing in boiling water had a denier of 31 and exhibited a tenacity of 6.4 grams/denier with 8% elongation and a stiffness of 112 grams/denier.

The dispersant initiator employed in the process of this invention is a polymeric substance containing tertiary amino groups, which may recur in regular or random fashion in the polymer. The tertiary amino groups may be an integral part of the polymer chain or they may be lateral substituent groups or parts of lateral substituent groups connected directly to the carbon atoms in the main polymer chain. The polymeric substances may be formed by addition polymerization or condensation polymerization, and may be either a homopolymer, a copolymer, or an interpolymer.

Examples of addition-type polymers are the homopolymers and copolymers of tertiary amino-substituted olefins; such as, p-(beta-diethylamino)-styrene, vinyl pyridines, and alkyl-substituted vinyl pyridines, e. g., 2-vinyl-5-ethylpyridine; polymerizable unsaturated amines, e. g., diallylamine; esters of acrylic and alpha-substituted acrylic acids with N-disubstituted aminoalcohols, e. g., beta-diethylaminoethyl acrylate or methacrylate, beta-di-n-butylaminoethyl acrylate or alpha-ethyl acrylate, beta-dicyclohexylaminoethyl acrylate or methacrylate; 4-(beta - methacrylyloxyethyl)morpholine; 1 - (beta - methacrylyloxyethyl) - piperidine; N - (beta - dimethylaminoethyl)acrylamide; and the like.

Copolymers derived from at least two different polymerizable compounds, one of which contains tertiary amino-nitrogen and the other is amine free and provides an oleophilic structure, are the preferred additives for use in preparing the superior formaldehyde polymers of this invention.

As the tertiary amino-nitrogen-containing component of the preferred group, there can be used the esters of tertiary-aminoalcohols with acids of the general formula:

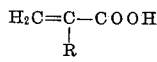

in which R may be hydrogen, alkyl, aralkyl, or cycloalkyl. Examples of such acids are acrylic and methacrylic acids, alpha-ethylacrylic acid, alpha-butylacrylic acid, alpha-isopropylacrylic acid, alpha-cyclohexylacrylic acid, alpha-benzylacrylic acid, etc. These acids may be made in accord with the process described in the articles by Mannich et al., Ber. 55, 3489 (1922), and Blaise et al., Bull. Soc. Chim. 33, 760 (1905).

The aminoalcohols esterified with the above acids are tertiary amines and contain one or more primary, secondary, or tertiary alcoholic hydroxyl groups. The amino-nitrogen group may contain substituents selected from the group of alkyl, aryl, aralkyl, or cycloalkyl groups or may be a member of a cyclic structure. Examples of suitable alcohols are beta-diethylaminoethanol, beta-di-n-propylaminoethanol, gamma-diethylaminopropanol, delta-dibutylaminobutanol, beta-(N-ethyl-N-cyclohexylamino)ethanol, 1-(beta - hydroxyethyl) - quinoline, beta-diphenylaminoethanol, and the like.

Typical ethylenically unsaturated monomers which contribute oleophilic properties to the tertiary amino-nitrogen-containing copolymers are esters of alcohols containing at least 6 carbon atoms with carboxylic acids having the aforementioned structure. Examples of such esters are hexyl acrylate or methacrylate, octyl acrylate or methacrylate, lauryl acrylate or methacrylate, octadecyl acrylate or methacrylate, etc.

A typical copolymer usefully employable in preparing the new formaldehyde polymers of this invention is the following:

Forty parts of technical lauryl methacrylate, 10 parts of beta-diethylaminoethyl methacrylate, and 0.25 part of alpha,alpha'-azodiisobutyronitrile were heated together in a polymerization reactor under an atmosphere of oxygen-free nitrogen at 58°±3° C. for 18 hours, stirring being effected by bubbling a stream of nitrogen through the reaction mixture. There was thus obtained an oil-soluble polymer containing the monomers in essentially the proportion charged, i. e., 80/20.

The beta-diethylaminoethyl methacrylate may be made as described in U. S. Patents 2,138,762, and 2,138,763. The lauryl methacrylate may be prepared by esterifying methacrylyl chloride with the mixed alcohols obtained by the carboxyl reduction of coconut oil.

Examples of condensation polymers usefully employable in preparing the superior formaldehyde polymers of this invention are the polyamides obtained by reacting dodecyliminodiacetic acid with pentamethylenediamine, and other polyamides having oleophilic structures obtained in accordance with the process described in U. S. Patent 2,274,831.

Still another type of polymeric substance containing tertiary-amine groups which may be employed in the preparation of the formaldehyde polymers of this invention are the products obtained by reductively aminating ethylene/carbon monoxide copolymers in the presence of secondary amines containing at least one oleophilic hydrocarbon group in accordance with the process described in U. S. Patent 2,495,255.

The amount of polymer, containing tertiary-amine groups, used in the processes of this invention may be hardly more than a trace in some embodiments, and may be present in any larger amount, although no particular advantage appears to be gained by employing more than about 20% by weight of nitrogen-containing polymer based on the monomeric formaldehyde which is to be polymerized. Preferred limits on the concentration of this nitrogen-containing polymer are from about 0.001% to about 5% by weight of the formaldehyde to be polymerized. The term "formaldehyde to be polymerized" is meant to include formaldehyde actually polymerized plus that amount retained in the reaction medium and the vapor space in the reactor. Formaldehyde which may be deliberately passed through the reactor in a recycle fashion or for purposes of sweeping out the reactor are not meant to be included in this term.

The reaction medium is an important feature in preparing the new formaldehyde polymers of this invention. The medium used should be one which is a non-solvent for the polymer and chemically inert to formaldehyde, and should be one which remains liquid under the temperature conditions of reaction. Hydrocarbons having 3 to 10 carbon atoms in the molecule, and mixtures thereof, are preferred reaction media because of their availability and because of their suitable vapor pressure and boiling range. Included in the group of hydrocarbons which are preferred are compounds such as cyclohexane, methylcyclohexane, 1,4-dimethylcyclohexane, butane, isobutane, propane, benzene, toluene, xylene, and the like.

The amount of reaction medium is not critical and can be from 1 to 1000 or more times the weight of the formaldehyde charged, depending on, among other things, whether a batch or continuous process is utilized. Since excellent results are obtained when the reaction medium is between 4 and 100 times the weight of the formaldehyde charged, that constitutes the preferred amount of reaction medium.

The polymerization of the anhydrous monomeric formaldehyde is effected at temperatures which may, in some embodiments, be as low as —120° C. or, in other embodiments, be as high as the boiling point of the reaction medium. The particular temperature selected depends on the particular tertiary amino-nitrogen-containing polymer used, the reaction medium, and other conditions of the reaction. The temperature selected is that at which formaldehyde polymer is formed rapidly and with minimum of apparatus requirements. As a general rule, these conditions are fulfilled in the range of 70° to —50° C. at atmospheric pressure and this therefore embraces the preferred temperature range, although other temperatures may be preferred when the pressure is superatmospheric or subatmospheric.

Since the tertiary-amino-nitrogen-containing polymer functions both as initiator and dispersing agent, other polymerization initiators are generally not required in the process of this invention. If desired, however, a supplemental initiator can be used such as primary, secondary, and tertiary aliphatic, including cycloaliphatic, amines and primary aromatic amines. Examples of such amine initiators are methyl, ethyl, butyl, octyl, dodecyl and octadecyl amines, dibutyl amine, ethyloctylamine, octadecyldimethylamine, tributylamine, trihexylamine, cyclohexylamine, diphenylamine, aniline, toluidine, and the like. In addition, arsines, stibines, and phosphines of the general formula:

in which M is arsenic, antimony, or phosphorus and R, $R_1$, and $R_2$ are monovalent hydrocarbon radicals may be used, as disclosed in copending application, Serial No. 365,235 filed by R. N. MacDonald on June 30, 1953. Examples of such initiators are triphenylphosphine, tritolylphosphine, trixylylphosphine, trinaphthylarsine, tributylphosphine, triethylstibine, methyldioctylarsine, and the like.

If an initiator is used, it is preferably added to the reaction medium portionwise as polymerization progresses. If desired, it can be employed in the form of a solution in a solvent which is generally the same as the reaction medium. The addition of the initiator is controlled to maintain the temperature of reaction within the range selected for operation. If initiator is added to the medium before the formaldehyde is passed into the reaction zone, then the rate of passage of the formaldehyde is controlled to maintain the temperature within the range selected for operation.

The amount of supplemental initiator may be from 0.00005 to 0.05 or more mol percent of the anhydrous monomeric formaldehyde.

The monomeric formaldehyde used in the process of this invention must be substantially anhydrous in order to prepare high quality polymers described herein. "Substantially anhydrous formaldehyde" is meant to include formaldehyde containing less than about 0.5% by weight of water, and preferably less than 0.1% by weight of water. The use of formaldehyde having more than about 0.5% water imparts undesirable qualities to the polymer such as low molecular weight and general instability and brittleness.

Analysis of the formaldehyde polymers of this invention, made by employing the amino-nitrogen-containing polymeric substances, shows that the polymeric formaldehyde product contains small amounts of nitrogen which cannot be extracted by solvent methods. It is not certain how this nitrogen is present in the polymer structure, although it is believed to be chemically combined as a part of the formaldehyde polymer chain.

Formaldehyde polymers produced in accordance to this invention are unique and quite different in properties from any hitherto known formaldehyde polymer. These polymers have been transformed into many useful articles, for example, films, funicular structures such as filaments, bristles, and fibers, and molded articles in general. Fibers may be formed by conventional methods using a melt spinning technique. In addition the compositions of this invention may contain pigments, fillers, reinforcing agents, other polymeric substances, and the like. Copolymers and interpolymers may be made including the polymeric formaldehyde of this invention.

We claim:

1. A normally solid, synthetic, film-forming composition resulting from the polymerization of formaldehyde in a liquid hydrocarbon medium containing a dissolved organic polymeric substance selected from the group consisting of (a) homopolymers of tertiary-amino-substituted olefins, (b) homopolymers of esters of N-dihydrocarbon-substituted aminoalcohols with an acid having the formula:

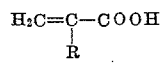

wherein R is selected from the group consisting of hydrogen, alkyl, aralkyl, and cycloalkyl, (c) copolymers of the said tertiary-amino-substituted olefins and an ester of an alcohol containing 6–18 carbon atoms and the above-described acid, and (d) copolymers of said esters of N-dihydrocarbon-substituted aminoalcohols and an ester of an alcohol containing 6–18 carbon atoms and the above-described acid, said organic polymeric substance having an inherent viscosity of at least 0.1 measured at 25° C. on a 0.1% weight:volume concentration in benzene; said composition comprising a high molecular weight polymer of formaldehyde chemically combined with 0.001%–20% by weight of said organic polymeric substance, said composition being characterized by exhibiting an inherent viscosity of at least 1.0 measured at 60° C. on a 0.5 weight percent solution of said composition in p-chlorophenol containing 2% by weight of alpha-pinene, said composition being further characterized by having a degree of toughness of at least 1.0.

2. The composition of claim 1 in which said organic polymeric substance is a copolymer of lauryl methacrylate and beta-diethylaminoethyl methacrylate.

3. A film comprising the composition described in claim 1.

4. A funicular structure comprising the composition described in claim 1.

5. A moldable substance comprising the composition described in claim 1.

6. A process for preparing a polymeric composition consisting essentially of high molecular weight polymeric formaldehyde chemically combined with 0.001%–20% by weight of an organic polymeric substance selected from the group consisting of (a) homopolymers of tertiary-amino-substituted olefins, (b) homopolymers of esters of N-dihydrocarbon-substituted aminoalcohols with an acid having the formula:

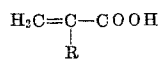

wherein R is selected from the group consisting of hydrogen, alkyl, aralkyl, and cycloalkyl, (c) copolymers of the said tertiary-amino-substituted olefins and an ester of an alcohol containing 6–18 carbon atoms and the above-described acid, and (d) copolymers of said esters of N-dihydrocarbon-substituted aminoalcohols and an ester of an alcohol containing 6–18 carbon atoms and the above described acid; said process consisting essentially of the steps of continuously passing a stream of monomeric formaldehyde of at least 99.5% purity into contact with a liquid reaction medium consisting essentially of a hydrocarbon having 3–10 carbon atoms per molecule and dissolved therein 0.001%–20% by weight of said monomeric formaldehyde of said organic polymeric substance having an inherent viscosity of at least 0.1 measured at 25° C. on a 0.1% weight:volume concentration in benzene, continuously agitating said reaction medium at a temperature of —50° C. to +70° C. at substantially atmospheric pressure as said monomeric formaldehyde is continuously passed into the reaction medium, and recovering particles of said polymeric composition having an inherent viscosity of at least 1.0 measured at 60° C. on a 0.5 weight percent solution of p-chlorophenol containing 2% alpha-pinene, said composition exhibiting a degree of toughness of at least 1.0.

7. The process of claim 6 in which said organic polymeric substance is a copolymer of lauryl methacrylate and beta-diethylaminoethyl methacrylate.

References Cited in the file of this patent

UNITED STATES PATENTS

| | | |
|---|---|---|
| 2,138,763 | Graves | Nov. 29, 1938 |
| 2,568,018 | MacLean et al. | Sept. 18, 1951 |

OTHER REFERENCES

Walker: "Some Properties of Anhydrous Formaldehyde," Journal Amer. Chem. Soc., volume 55, page 2822.